US009071791B2

(12) United States Patent
Kawasaki

(10) Patent No.: US 9,071,791 B2
(45) Date of Patent: Jun. 30, 2015

(54) RECEIVING DEVICE AND TRANSMITTING DEVICE

(71) Applicant: OLYMPUS CORPORATION, Tokyo (JP)

(72) Inventor: Shinya Kawasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 13/794,074

(22) Filed: Mar. 11, 2013

(65) Prior Publication Data

US 2013/0194478 A1     Aug. 1, 2013

Related U.S. Application Data

(63) Continuation of application No. PCT/JP2011/070033, filed on Sep. 2, 2011.

(30) Foreign Application Priority Data

Sep. 13, 2010  (JP) .................................. 2010-204511

(51) Int. Cl.
  *H04N 5/232*  (2006.01)
  *H04N 5/44*  (2011.01)
  *H04M 1/725*  (2006.01)
  *H04N 21/431*  (2011.01)
  *H04N 21/4363*  (2011.01)

(52) U.S. Cl.
  CPC ......... *H04N 5/4403* (2013.01); *H04M 1/72555* (2013.01); *H04N 21/4312* (2013.01); *H04N 21/43637* (2013.01)

(58) Field of Classification Search
  None
  See application file for complete search history.

(56) References Cited

U.S. PATENT DOCUMENTS 6,680,746 B2 *   1/2004   Kawai et al. ............... 348/211.9
2006/0026536 A1 *   2/2006   Hotelling et al. ............. 715/863
(Continued)

FOREIGN PATENT DOCUMENTS

JP      11-136618 A      5/1999
JP      2003-288558 A   10/2003
(Continued)

OTHER PUBLICATIONS

Hiroshi Ashida, "Visual Motion Perception and Motion Pictures", Visual Psychophysics, Journal of The Institute of Image Information and Televison Engineers, vol. 58, No. 8, 2004, pp. 1151-1156. w/partial translation.

(Continued)

*Primary Examiner* — Lin Ye
*Assistant Examiner* — John H Morehead, III
(74) *Attorney, Agent, or Firm* — Westerman, Hattori, Daniels & Adrian, LLP

(57) ABSTRACT

A receiving device provided with: a receiving unit for receiving image data from a transmitting device with which the receiving device has established wireless communication; a display unit for displaying setting data for a different transmitting device from the aforementioned transmitting device to establish wireless communication with the receiving device and the image data; and a display control unit for controlling the display of the display unit such that, in the frames displayed before and after a frame containing the setting data, the image data is displayed in the same display region as the display region for the display unit in which the setting data is displayed.

10 Claims, 15 Drawing Sheets

(56) References Cited

U.S. PATENT DOCUMENTS

| | | | |
|---|---|---|---|
| 2009/0128634 A1* | 5/2009 | Miura et al. | 348/207.1 |
| 2011/0050926 A1* | 3/2011 | Asano | 348/211.2 |
| 2012/0166997 A1* | 6/2012 | Cho et al. | 715/778 |
| 2014/0037165 A1* | 2/2014 | King et al. | 382/128 |
| 2014/0089854 A1* | 3/2014 | Storrusten | 715/830 |

FOREIGN PATENT DOCUMENTS

| | | |
|---|---|---|
| JP | 2004-236293 A | 8/2004 |
| JP | 2005-039686 A | 2/2005 |
| JP | 2007-135014 A | 5/2007 |
| JP | 2007-312179 A | 11/2007 |
| JP | 2008-033625 A | 2/2008 |
| JP | 2008-77380 A | 4/2008 |
| JP | 2008-176190 A | 7/2008 |
| JP | 2009-284390 A | 12/2009 |
| JP | 2009-296239 A | 12/2009 |
| JP | 2010-177735 A | 8/2010 |

OTHER PUBLICATIONS

International Search Report for PCT/JP2011/070033, mailing date of Sep. 27, 2011.

Cited in Japanese Office Action dated Sep. 9, 2014, issued in corresponding Japanese Application No. 2010-204511, with English Translation (6 pages).

Japanese Notice of Allowance dated Feb. 24, 2015, issued in corresponding JP Patent Application No. 2010-204511 with English translation (7 pages).

* cited by examiner

RECEIVING DEVICE AND TRANSMITTING DEVICE

CROSS REFERENCE TO RELATED APPLICATIONS

This application is a continuation application based on a PCT Patent Application No. PCT/JP2011/070033, filed Sep. 2, 2011, whose priority is claimed on Japanese Patent Application No. 2010-204511, filed on Sep. 13, 2010, the entire content of which are hereby incorporated by reference.

BACKGROUND OF THE INVENTION

1. Field of the Invention

The present invention relates to a receiving device and a transmitting device.

2. Description of the Related Art

A wireless communication system is known in which the communication paths between a plurality of transmitting devices and a plurality of receiving devices are made wireless, and in which it is possible to switch the communication connection between the transmitting devices and the receiving devices. In such a wireless communication system, for example, if switching of the wireless connection setting, such as switching the transmitting device connected to the receiving device A from the transmitting device A to the transmitting device B, is performed frequently, it is desirable to eliminate the operation as much as possible by the user her/himself disconnecting between the receiving device A and the transmitting device A, and placing the receiving device A in the connection setting condition first, and then making reconnection to the transmitting device B.

Also, in a known method for making a simple and reliable wireless connection to a desired device, for example, a receiving device displays on a display unit a two-dimensional code that includes connection information, and a transmitting device captures and decodes the image of the two-dimensional code to obtain the connection information, establishing a connection for communication with the receiving device based on the obtained connection information (for example, Japanese Unexamined Patent Application, First Publication No. 2009-296239).

However, when a receiving device displays a two-dimensional code on the display unit, a display region for displaying the two-dimensional code is necessary, or it is necessary to display the two-dimensional code laid over images and the like that are displayed on the display unit. For this reason, the display region of the display unit in which images and the like can be displayed is reduced.

FIG. 17 is a simplified drawing showing a conventional known example of a display on a display unit when a display region of information of the wireless settings is provided as a region for displaying a two-dimensional code. As shown in the drawing, if display region of information of the wireless settings 1701 is provided as a region for displaying a two-dimensional code on the display unit 1700, an unusable region 1703 that cannot be used as an image display region 1702 occurs. FIG. 18 is a simplified drawing showing a conventionally known example of a display on a display unit when a two-dimensional code is displayed laid over an image or the like that is displayed in the image display region. If a two-dimensional code is displayed laid over images or the like displayed in the image display region 1801 of the display unit 1800 as shown in the drawing, it is not possible to display an image in the display region of information of the wireless settings 1802 that displays the two-dimensional code.

Also, a method of printing information of the wireless settings onto a seal and adhering the seal to an enclosure, or a method of printing the information of the wireless settings onto the enclosure holds the information of settings for configuring a wireless network fixed, and lacks flexibility. For this reason, these are not suitable for a situation in which the network environment changes frequently.

SUMMARY

The present invention provides a receiving device and a transmitting device that, without reducing the display region of the display unit, enables simple switching of the wireless connection.

A receiving device in accordance with a preferred embodiment of the present invention may include: a receiving unit that receives image data from a transmitting device with which the receiving device has established a wireless communication connection; a display unit that displays setting data necessary for a different transmitting device from the transmitting device to establish the wireless communication connection with the receiving device and the image data; and a display control unit that controls the display of the display unit so that the image data is displayed on the same display region as that of the display unit that displays the setting data, in frames displayed before and after a frame including setting data.

Preferably, in the receiving device in accordance with a preferred embodiment of the present invention, if the display unit displays on the display unit a plurality of frames including the setting data, in each of the frames including the setting data, the display control unit may perform control so that the setting data is displayed in the substantially same region within the display region of the display unit, and control the display of the display unit so as not to include the setting data in the prescribed frame.

Preferably, in the receiving device in accordance with a preferred embodiment of the present invention, the display control unit may control the display of the display unit so that the setting data is displayed laid over a part of the display region of the display unit displaying image data.

Preferably, in the receiving device in accordance with a preferred embodiment of the present invention, if the display unit displays a frame including the setting data, the display control unit may control the display of the display unit so that the setting data is displayed on a different display region from that in which the setting data has been immediately previously displayed.

Preferably, in the receiving device in accordance with a preferred embodiment of the present invention, if the display unit displays a frame including the setting data, the display control unit may control the display of the display unit so that only a part of the setting data is displayed and all or a part of the remaining setting data is displayed in a different frame from that frame.

A transmitting device in accordance with a preferred embodiment of the present invention may include: an image capturing unit that captures an image on the display unit of the receiving device; an identification unit that identifies, from the data imaged by the image capturing unit, the setting data necessary for establishing wireless communication connection with the receiving unit; and a communication unit that establishes wireless communication connection with the receiving device based on the identified setting data.

Preferably, in the transmitting device in accordance with a preferred embodiment of the present invention, the identification unit may identify the setting data based on a plurality of the data imaged a plurality of times by the image capturing unit.

Preferably, in the transmitting device in accordance with a preferred embodiment of the present invention, the identification unit may generate and identify the setting data from a part of the setting data included in each of a plurality of the imaged data.

Preferably, in the transmitting device in accordance with a preferred embodiment of the present invention, if the frame including the setting data is displayed on the display unit, the display control unit may set the background color within the display region of the setting data based on the color arrangement of the image data in the immediately previous displayed frame.

Preferably, in the transmitting device in accordance with a preferred embodiment of the present invention, if the frame including the setting data is displayed on the display unit, the display control unit may set a position or size of the display region of the setting data based on the color arrangement of the image data laid over the setting data.

Preferably, in the transmitting device in accordance with a preferred embodiment of the present invention, if the frame including the setting data is displayed on the display unit, the display control unit may set a position or size of the display region of the setting data based on frequency component information of the image data laid over the setting data.

According to the receiving device in accordance with a preferred embodiment of the present invention, the receiving unit receives image data from a transmitting device with which it has established a wireless communication connection. The display unit displays image data and setting data necessary for establishing a wireless communication connection with its own device. The display control unit controls the display of the display unit so that, image data is displayed in the same display region of the display unit that display setting data, in frames displayed before and after a frame that includes setting data. By doing this, because the display of setting data for two or more continuous frames in the same display region is eliminated, it is possible to display the setting data without causing the user to notice the setting data. It is therefore possible to switch the wireless connection simply, without reducing the display region of the display unit.

According to the transmitting device in accordance with a preferred embodiment of the present invention, the image capturing unit captures an image on the display unit of the receiving device that controls the display of the display unit so that image data is displayed in the same display region of the display unit that displays setting data, in frames before and after the frames that include the setting data. The identification unit identifies, from the data imaged by the image capturing unit, the setting data necessary for establishing wireless communication connection with a receiving device. The communication unit establishes wireless communication connection with the receiving device based on the identified setting data. It is therefore possible to switch the wireless connection simply, without reducing the display region of the display unit of the receiving device.

DESCRIPTION OF THE PREFERRED EMBODIMENTS

First Preferred Embodiment

Figure 1:
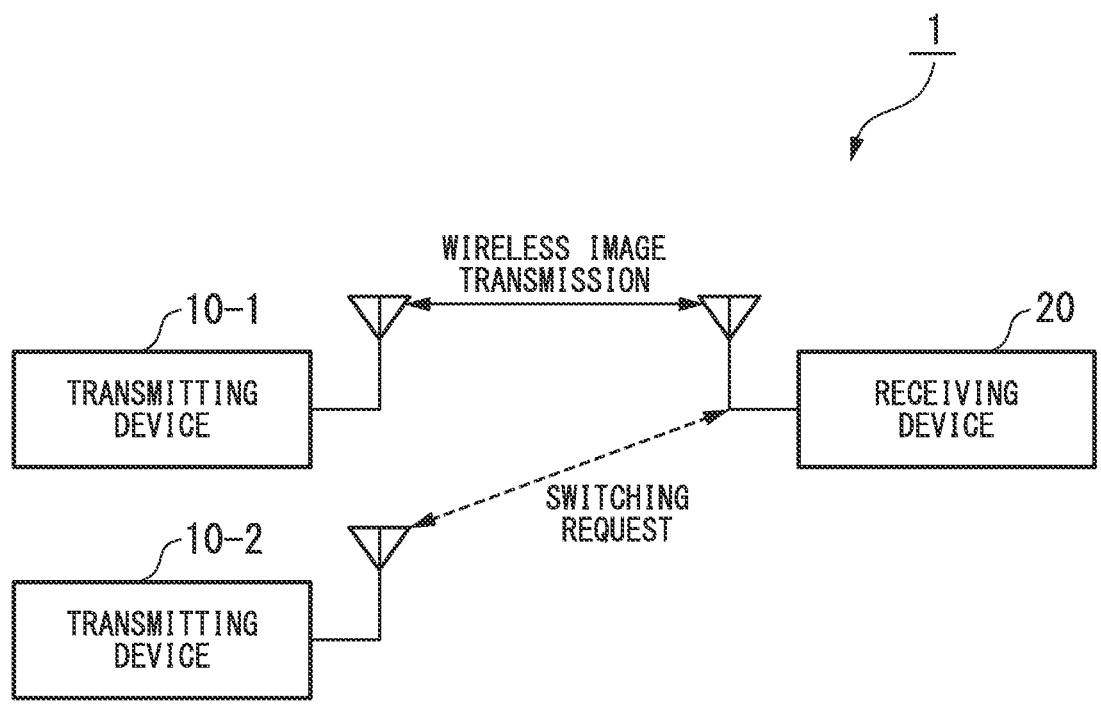
FIG. 1 is a simplified drawing showing the constitution of a transmitting and receiving system in accordance with the first preferred embodiment of the present invention.

The first preferred embodiment of the present invention will be described below, with references made to the drawings. FIG. 1 is a simplified drawing showing the constitution of a transmitting and receiving system in accordance with the first preferred embodiment of the present invention. The transmitting and receiving system 1 has a plurality of transmitting devices 10 (10-1, 10-2) and a receiving device 20. A transmitting device 10 captures an image and transmits the captured image data to the receiving device 20 to which it is connected. The receiving device 20 displays the image on a display unit based on the transmitted image data.

The communication paths between the plurality of transmitting devices 10 and the receiving device 20 are wireless, and the transmitting device 10 that communicates with the receiving device 20 can be switched. The illustrated example shows the example of a wireless communication connection established between the transmitting device 10-1 and the receiving device 20, image data being transmitted from the transmitting device 10-1 to the receiving device 20 and, when displaying the received image data, the receiving device 20 switching the transmitting device 10 that communicates with the receiving device 20 from the transmitting device 10-1 to the transmitting device 10-2. The method of switching the transmitting device 10 that communicates with the receiving device 20 will be described later.

Figure 2:
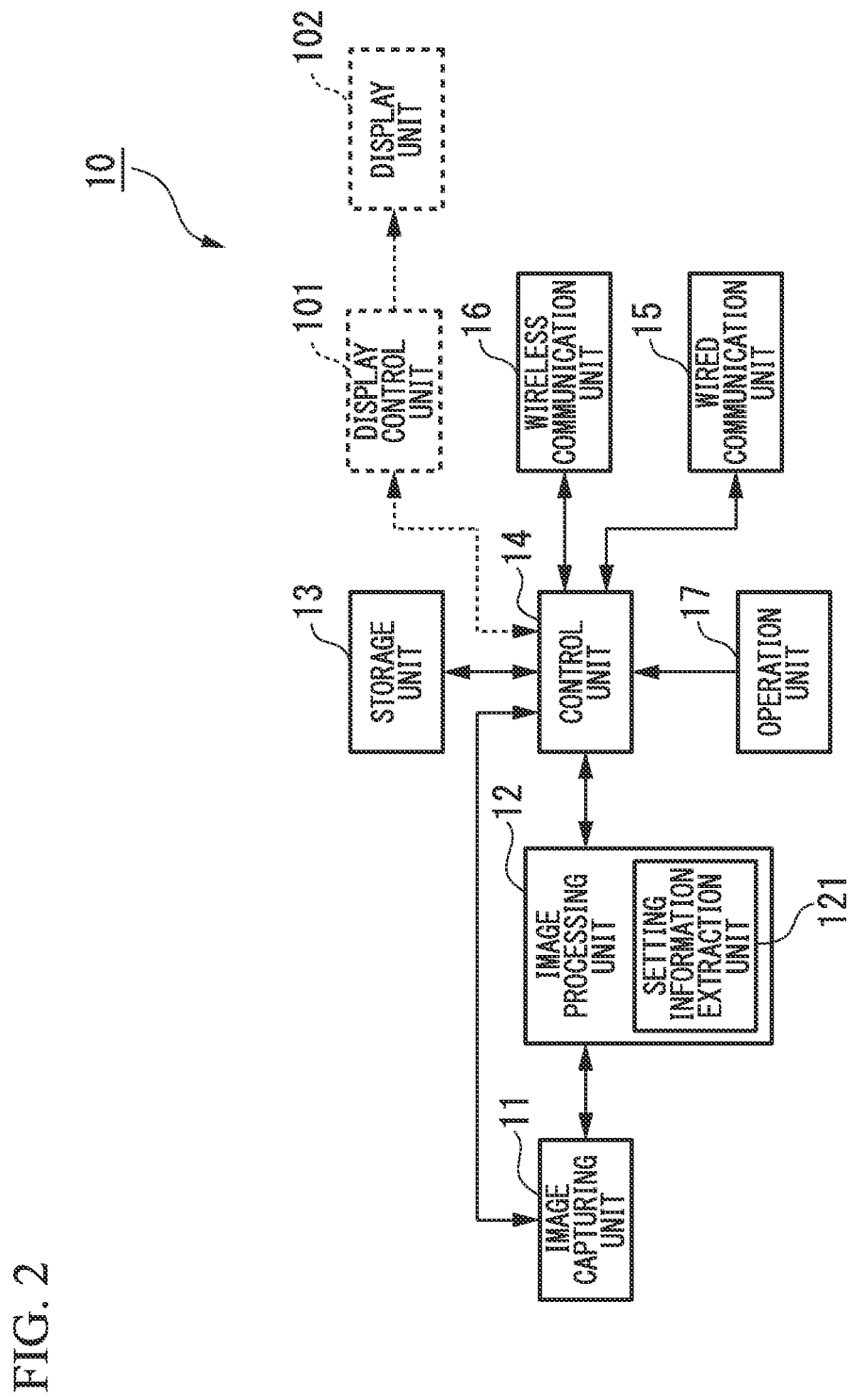
FIG. 2 is a block diagram showing the constitution of the transmitting device in accordance with the first preferred embodiment of the present invention.

Next, the constitution of the transmitting device 10 will be described. FIG. 2 is a block diagram showing the constitution of the transmitting device 10 in accordance with the first preferred embodiment of the present invention. In the illustrated example, the transmitting device 10 has an image capturing unit 11, an image processing unit 12, a storage unit 13, a control unit 14, a wired communication unit 15, a wireless communication unit 16 (communication unit), and an operation unit 17. Also, the image processing unit 12 includes a setting information extraction unit 121 (an identification unit). The transmitting device 10 may also have a display control unit 101 and a display unit 102. The display control unit 101 and the display unit 102 are the same as the units provided in the receiving device 20, which will be described later.

The image capturing unit 11 has an image sensor (for example, a CCD (charge-coupled device) or a CMOS (complementary metal oxide semiconductor) sensor) and an A/D converter. The image capturing unit 11 captures the image of a subject and converts the optical image of the subject to a digital signal. The image processing unit 12 generates image data from the digital signal converted by the image capturing unit 11, and perform image processing of the generated image data. The setting information extraction unit 121 judges whether or not information of the wireless settings (setting data) is included in the image data and, if information of the wireless settings is included, the unit 121 extracts the information of the wireless settings. The storage unit 13 stores programs and various data. The control unit 14 controls the various parts of the transmitting device 10. The wired communication unit 15 transmits and receives data with an external device by a wired connection. The wireless communication unit 16 transmits and receives image data, control data, and the like with the receiving device 20 by a wireless connection. The operation unit 17 has buttons, and levers that can be operated by a user and accepts input of instructions from a user.

Figure 3:
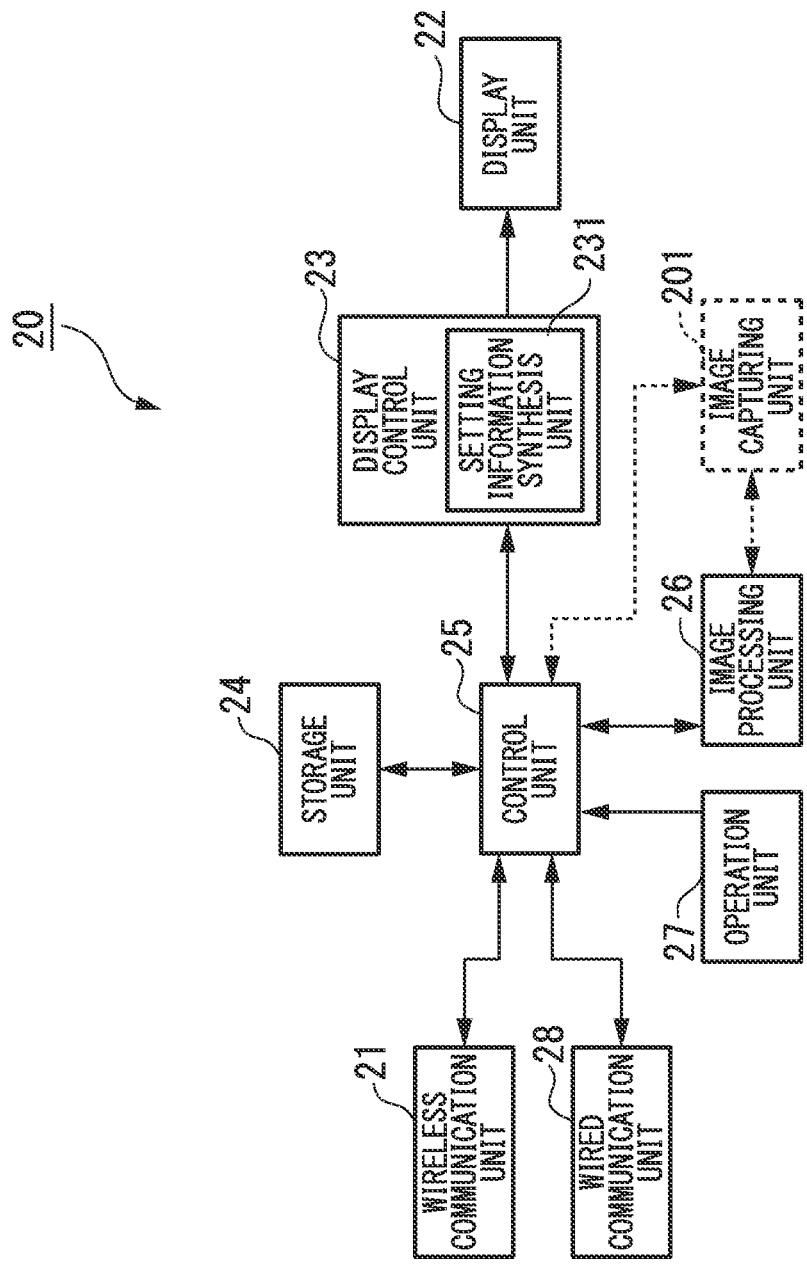
FIG. 3 is a block diagram showing the constitution of the receiving device in accordance with the first preferred embodiment of the present invention.

Next, the constitution of the receiving device 20 will be described. FIG. 3 is a block diagram showing the constitution of the receiving device 20 in accordance with the first preferred embodiment of the present invention. In the illustrated example, the receiving device 20 has a wireless communication unit 21, a display unit 22, a display control unit 23, a storage unit 24, a control unit 25, an image processing unit 26, an operation unit 27, and a wired communication unit 28. The display control unit 23 has a setting information synthesis unit 231. The receiving device 20 may also have an image capturing unit 201. The image capturing unit 201 is the same as the image capturing unit 11 of the transmitting device 10.

The wireless communication unit 21, by establishing a wireless communication connection, transmits and receives image data, control data, and the like with a transmitting device 10. The display unit 22 displays images and the like. The display control unit 23 generates images that are displayed on the display unit 22 and controls the display unit 22. The setting information synthesis unit 231 converts the information of the wireless settings (setting data) to an image of information of the wireless settings, and generates a frame of information of the wireless settings (movie frame) that includes the generated image of information of the wireless settings. The storage unit 24 stores programs and various data such as information of the wireless settings. The control unit 25 controls various parts of the receiving device 20. The image processing unit 26 performs image processing. The operation unit 27 has buttons and levers that can be operated by a user and accepts input of instructions from a user. The wired communication unit 28 transmits and receives data with an external device by establishing a wired connection.

Although the constitutions of the transmitting device 10 and the receiving device 20 have been described with references made to FIG. 2 and FIG. 3, as described above, the transmitting device 10 may have a display control unit 101 and a display unit 102, and the receiving device 20 may have an image capturing unit 201. For example, when a device having both an image capturing unit and a display unit, such as a digital camera, transmits and receives data by wireless communication, the transmitting device could also serve as a receiving device (refer to the dashed line parts in FIG. 2 and FIG. 3).

Next, the protocol whereby the transmitting device 10 transmits a captured image to the receiving device 20 by using wireless communication, and the receiving device 20 receives the transmitted image and displays the image on the display unit 22 will be described.

The digital signal that is the output from the image capturing unit 11 of the transmitting device 10 is subjected to image processing and generation of image data by the image capturing processing unit 12, the image data being stored in the storage unit 13. The image data stored in the storage unit 13, after being divided into packets of a prescribed size by the control unit 14, is input to the wireless communication unit 16. The wireless communication unit 16 has a baseband unit that controls communication and a high-frequency unit that includes an antenna. The packets that are input to the wireless communication unit 16 are radiated into space as radio waves from the antenna.

The wireless communication unit 21 of the receiving device 20 has an antenna, a high-frequency unit, and a baseband unit and, via the antenna, receives at the high-frequency unit packets radiated as radio waves in space. The received packets are demodulated in the high-frequency unit, and are processed in the baseband unit. The packets processed in the baseband unit are stored in the storage unit 24. The control unit 25 reconstructs the packets stored in the storage unit 24 and generates image data. The image data generated by the control unit 25 is subjected to image processing such as edge enhancement and noise reduction by the image processing unit 26. The image-processed image data becomes the data that can be displayed on the display unit 22 by the display control unit 23. The display unit 22 displays the image data that has been made displayable data. The image data displayed on the display unit 22 is updated, for example, every 1/60 second. Although modes of displaying the image data are an interlaced mode, in which one frame is displayed with even and odd lines are alternately displayed, and a progressive (non-interlaced) mode in which one frame displays the entire image, because the present invention can be applied in the case of either display mode, there is no particular restriction.

Next, the method of establishing a communication connection by wireless between a transmitting device 10 and the receiving device 20 will be described. In the first preferred embodiment, the receiving device 20 displays on the display unit 22 an image of information of the wireless settings that includes information of the wireless settings, and that has an interval that is thought to be difficult for the human eye to detect, and also that the transmitting device 10 can image. The information of the wireless settings is information that includes information necessary for the receiving device 10 in order to establish a wireless communication connection with a transmitting device 20. For example, the information of the wireless settings includes a wireless address (MAC address), a wireless channel (frequency used), and a network ID. There may be cases in which the information of the wireless settings includes a key used in encryption. The image of information of the wireless settings is the information of the wireless settings in the form of an image, and may be an image of characters (text) as is, or may be in a two-dimensional code format that can be read by the transmitting device 10.

Figure 4:
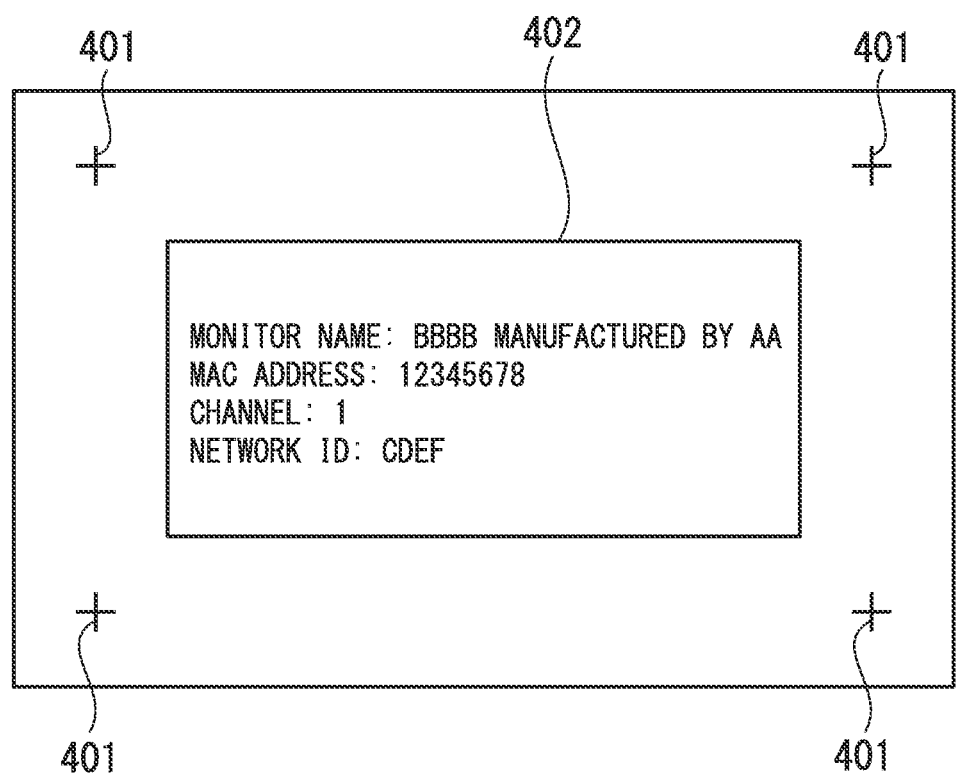
FIG. 4 is a simplified drawing showing an example of a frame of information of the wireless settings in accordance with the first preferred embodiment of the present invention.

FIG. 4 is a simplified drawing showing an example of a frame of information of the wireless settings that includes an image of information of the wireless settings in accordance with the first preferred embodiment of the present invention. In the illustrated example, the frame of information of the wireless settings displays the symbols "+" 401 in its four corners to indicate the inclusion of an image of information of the wireless settings, and displays at its center an image 402 of information of the wireless settings. The image 402 of information of the wireless settings includes "Monitor name: 13131313 manufactured by AA", "MAC address: 12345678", "Channel: 1", and "Network ID: CDEF". Although the symbols "+" 401 in its four corners to explicitly indicate the inclusion of an image of information of the wireless settings are shown in the illustrated example, there is no restriction to the symbol "+" 401, it being sufficient to have something that explicitly indicates the inclusion of an image of information of the wireless settings.

The frame rate when the receiving device 20 displays an image (movie image) is, for example, 60 fps. In this case, the display unit 22 displays a movie image by displaying frames every 1/60 s (16 ms). As noted in the Journal of The Institute of Image Information and Television Engineers, Vol. 58, No. 8, pp. 1151-1156 (2004), although a generalization is not possible, the temporal resolution of the human sense of vision is no more than approximately 60 Hz. That is, it is thought that, if the information of the wireless settings is displayed for less than 16 ms, it would be difficult to detect by the human eye. For this reason, during the time the display unit 22 is displaying a movie image, if the frame of information of the wireless settings shown in FIG. 4 is displayed for only one frame of 60 frames, the user would not be able to detect the image of information of the wireless settings, and would notice only the movie image. Also, if the surrounding area is dark, such as in a movie theater, even if the frame rate is 24 fps (24 Hz, a frame being displayed every approximately 40 ms), the human eye would not be able to detect an image displayed for one frame only.

Next, the protocol for displaying the information of the wireless settings on the display unit 22 when image data transmitted from the transmitting device 10-1 is displayed on the display unit 22 will be described. The following description uses an example in which a wireless communication connection is established between the transmitting device 10-1 and receiving device 20, with image data transmitted from the transmitting device 10-1 to the receiving device 20 and, when the receiving device 20 displays the received image data on the display unit 22, the transmitting device 10 that is communicating with the receiving device 20 is switched from the transmitting device 10-1 to the transmitting device 10-2.

Figure 5:
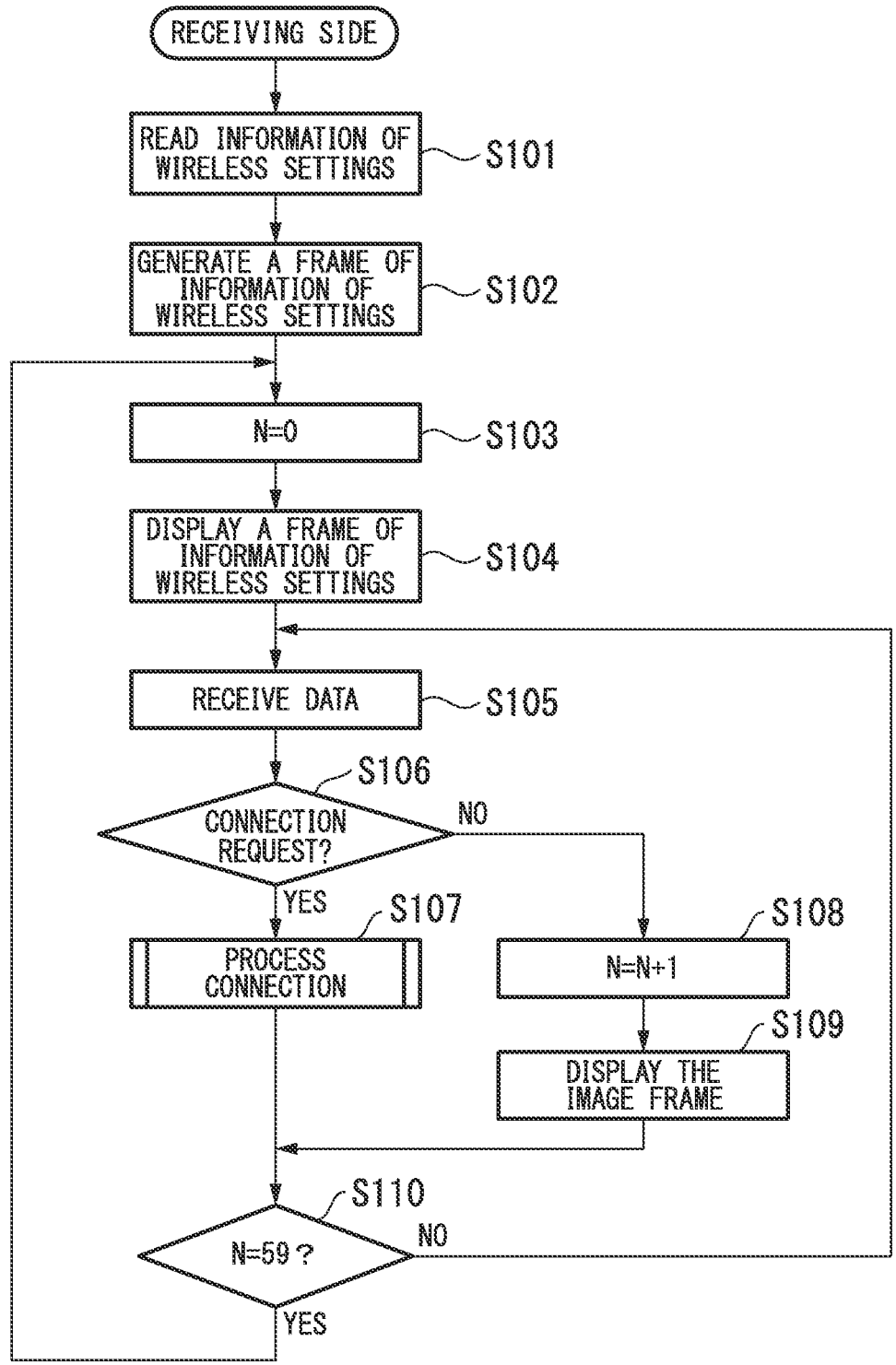
FIG. 5 is a flowchart showing the protocol for displaying the image of information of the wireless settings on the display unit in accordance with the first preferred embodiment of the present invention.

FIG. 5 is a flowchart showing the protocol for displaying the image of information of the wireless settings on the display unit 22 when the receiving device 20 of the first preferred embodiment displays image data transmitted from the transmitting device 10-1 on the display unit 22. The illustrated example is one in which the receiving device 20 displays a frame every 1/60 second (frame rate of 60 fps).

(Step S101)
The control unit 25 of the receiving device 20 reads the information of the wireless settings stored by the storage unit 24. After that, processing proceeds to the step S102.

(Step S102)
The setting information synthesis unit 231 of the display control unit 23 converts the information of the wireless settings read by the control unit 25 at the step S101 to an image of information of the wireless settings. Then, the setting information synthesis unit 231 generated a frame of information of the wireless settings that includes the image of information of the wireless settings. After that, processing proceeds to the step S103.

(Step S103)
The display control unit 23 sets the image frame count to N=0. After that, processing proceeds to the step S104.

(Step S104)
The display control unit 23 displays on the display unit 22 the frame of information of the wireless settings generated at the step S102. After that, processing proceeds to the S105.

(Step S105)
The wireless communication unit 21 receives data. After that processing proceeds to the step S106.

(Step S106)
The control unit 25 judges whether or not the data received by the wireless communication unit 21 at the step S105 is a connection request signal. If the data received by the wireless communication unit 21 is judged by the control unit 25 to be a connection request signal (that is, if it is a connection request packet, and includes the transmitting device address, and the receiving device address or the like obtained by the setting method to be described later), processing proceeds to the step S107, and in other cases processing proceeds to the step S108.

(Step S107)
The control unit 25 performs connection processing, which will be described later. After that processing proceeds to the step S110.

(Step S108)

The display control unit 23 sets the image frame counter to N=N+1. After that, processing proceeds to the step S109.

(Step S109)

The display control unit 23, based on the data received at the step S105, displays the image frame. After that, processing proceeds to the step S110.

(Step S110)

The display control unit 23 judges whether or not N is 59. If the display control unit 23 judges that N is 59, processing returns to the step S103, and in other cases processing returns to the step S105.

Figure 6:
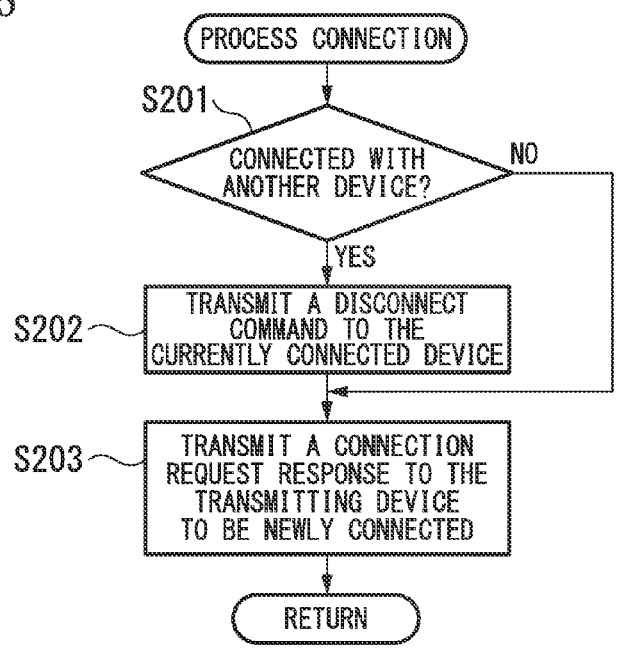
FIG. 6 is a flowchart showing the protocol of connection processing of the receiving device in accordance with the first preferred embodiment of the present invention.

Next, the protocol for the connection control of the receiving device 20 will be described. FIG. 6 is a flowchart showing the protocol of connection processing of the receiving device 20 in accordance with the first preferred embodiment of the present invention.

(Step S201)

The control unit 25 judges whether or not a wireless communication connection is established with a device that is different from the transmitting device 10 that has transmitted the connection request. If the control unit 25 judges that a wireless communication connection is established with a device that is different from the transmitting device 10 that has transmitted the connection request, processing proceeds to the step S202, and in other cases processing proceeds to the step S203.

(Step S202)

The control unit 25 transmits, via the wireless communication unit 21, a disconnect command that disconnects the connection with respect to the device with which a wireless communication connection is established, thereby breaking the wireless communication connection with that device. After that, processing proceeds to the step S203.

(Step S203)

The control unit 25 transmits a connection request response, which is a command to start a wireless communication connection with respect to the transmitting device 10 that has transmitted the connection request. By doing this, the wireless communication connection is established between the receiving device 20 and the transmitting device 10 that has transmitted the connection request. After that, processing ends.

By the processing of the above-described step S101 to step S110 and step S201 to step S203, the receiving device 20 displays the frame of information of the wireless settings for one frame, after which it displays an image frame for 59 frames. The receiving device 20 can establish a wireless communication connection with the transmitting device 10 that has transmitted the connection request signal.

Figure 7:
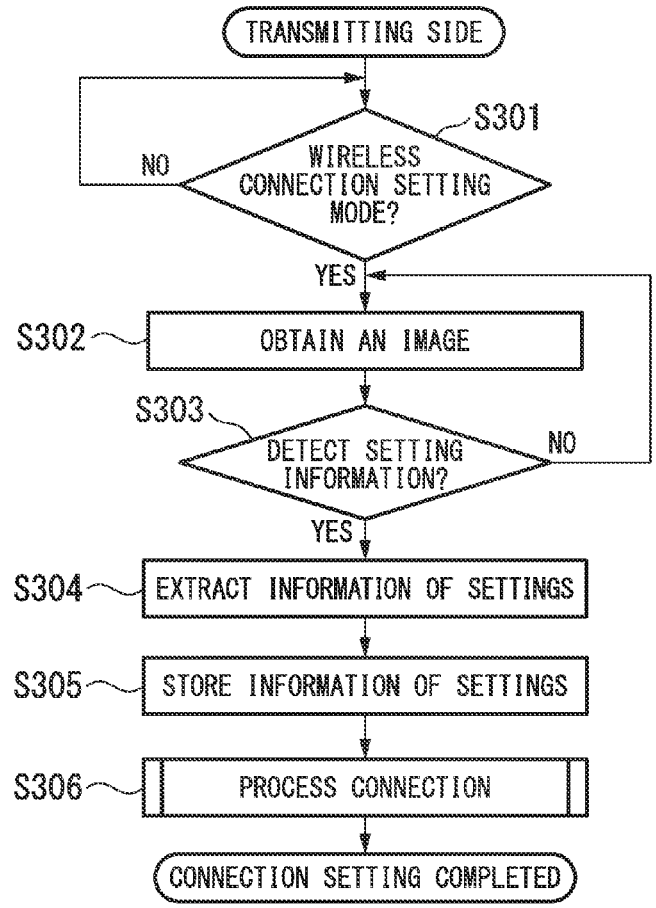
FIG. 7 is a flowchart showing the operating protocol for a transmitting device in accordance with the first preferred embodiment of the present invention.

Next, the operating protocol for a transmitting device 10 to be newly connected to the receiving device 20 will be described. FIG. 7 is a flowchart showing the operating protocol for a transmitting device 10 to be newly connected to the receiving device 20. If a connection of a new transmitting device 10 is to be made to the receiving device 20, the user operates the operation unit 17 of that transmitting device 10, and switches the operating mode of the transmitting device 10 to the wireless connection setting mode. Also, if the user is using the receiving device 20 for the first time, the operating mode of the transmitting device 10 may be made to be automatically changed to the wireless connection setting mode.

(Step S301)

The control unit 14 of the transmitting device 10 judges whether or not the operating mode is the wireless connection setting mode. If the control unit 14 judges that the operating mode is the wireless connection setting mode, processing proceeds to the step S302, and in other cases the processing of the step S301 is executed again. If the operating mode is not the setting mode, the standby mode may be enabled, or if the storage unit already has the setting information, setting processing may be done based on that information.

(Step S302)

The user brings the image capturing unit 11 of the transmitting device 10 into opposition with the display unit 22 of the receiving device 20 to which the connection is to be made. The image capturing unit 11 captures an image of the display unit 22 of the receiving device 20, and converts the optical image of the subject to a digital signal. The image processing unit 12 generates image data from the digital signal converted by the image capturing unit, and subjects the generated image data to image processing. After that, processing proceeds to the step S303. The transmitting device 10 captures an image of the display unit 22 of the receiving device 20 at a frame rate that is greater than the frame rate with which the receiving device 20 displays the movie image. For example, if the receiving device 20 displays the movie image at a frame rate of 60 fps, the transmitting device 10 captures the image of the display unit 22 of the receiving device 20 at a frame rate of greater than 60 fps.

(Step S303)

The setting information extraction unit 121 of the image processing unit 12 judges whether or not the image data generated at the step S302 includes an image of information of the wireless settings. If the setting information extraction unit 121 judges that the image data generated at the step S302 includes an image of information of the wireless settings, processing proceeds to the step S304, and in other cases processing returns to the step S302. Specifically, because a symbol indicating the inclusion of the image of information of the wireless settings (for example, the symbol "+") is displayed at a prescribed location in a frame that includes an image of information of the wireless settings, the setting information extraction unit 121 detects the existence or non-existence of the symbol indicating the inclusion of the information of the wireless settings by image scanning or the like. Then, if the symbol indicating inclusion of the information of the wireless settings is detected, the setting information extraction unit 121 judges that the image data includes an image of information of the wireless settings.

(Step S304)

The setting information extraction unit 121 extracts the information of the wireless settings from the image data generated at the step S302. After that, processing proceeds to the step S305. The specific method of extraction is, for example, if the image of information of the wireless settings is text as is in the form of an image, the extraction of the information of the wireless settings by using character recognition processing.

(Step S305)

The control unit 14 stores the information of the wireless settings extracted by the setting information extraction unit 121 at the step S304 into the storage unit 13. After that, processing proceeds to the step S306.

(Step S306)

The control unit 14 performs connection processing, which will be described later. After that, processing is ended.

Figure 8:
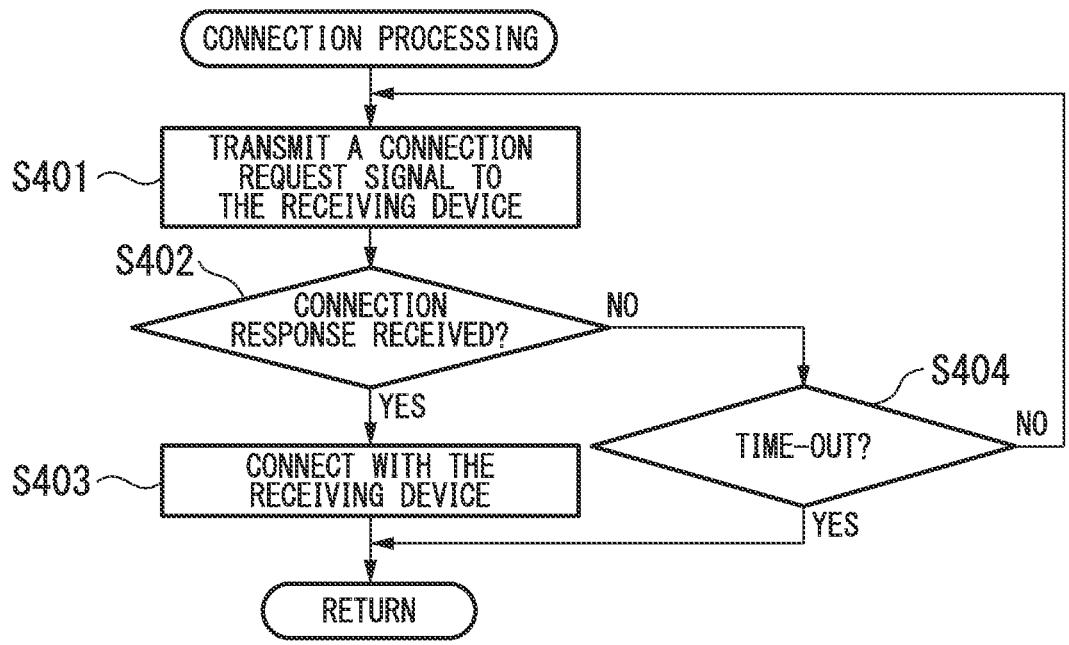
FIG. 8 is a flowchart showing the protocol of the connection processing of the transmitting device in accordance with the first preferred embodiment of the present invention.

Next, the protocol of the connection processing of the transmitting device 10 will be described. FIG. 8 is a flowchart showing the protocol of the connection processing of the transmitting device 10 in accordance with the first preferred embodiment of the present invention.

(Step S401)

The control unit 14 transmits a connection request signal, via the wireless communication unit 15, to the receiving device 20 which is uniquely identified (for example, by an MAC address) by the information of the wireless settings stored by the storage unit 13. After that, processing proceeds to the step S402.

(Step S402)

The control unit 14 judges whether or not the wireless communication unit 15 has received a connection request response transmitted from the receiving device 20. If the control unit 14 judges that the wireless communication unit 15 has received a connection request response transmitted from the receiving device 20, processing proceeds to the step S403, and in other cases processing proceeds to the step S404.

(Step S403)

The control unit 14 establishes a wireless communication connection with the receiving device 20. After that, processing is ended.

(Step S404)

The control unit 14 judges whether or not a prescribed amount of time has elapsed (that is, whether a time-out has occurred) from the start of the connection processing. If the control unit 14 judges that the prescribed amount of time has elapsed since the start of the connection processing, the processing is ended, and in other cases processing proceeds to the step S401.

By the processing of the above-described step S301 to step S306 and step S401 to step S404, the transmitting device 10 can establish a wireless communication connection with the receiving device 20.

As described above, according to the first preferred embodiment, by inserting a frame of information of the wireless settings that includes an image of information of the wireless settings between image data frames, information of the wireless settings can be displayed while having the user see the usually displayed image data, without having the user notice the image of information of the wireless settings. By doing this, the receiving device 20 can display information of the wireless settings that includes information required for the establishment of a wireless communication connection between the transmitting device 10 and the receiving device 20, without wasting a display region on the display unit 22. Also, because the transmitting device 10 can obtain the information of the wireless settings by merely capturing an image of the display unit 22 of the receiving device 20, it is only necessary for the user to bring the image capturing unit 11 of the transmitting device 10 into opposition with the display unit 22 of the receiving device 20 and cause the image capturing unit 11 to capture an image of the display unit 22, in order to make settings of a wireless communication between the transmitting device 10 and the receiving device 20, both simply and reliably.

Figure 9:
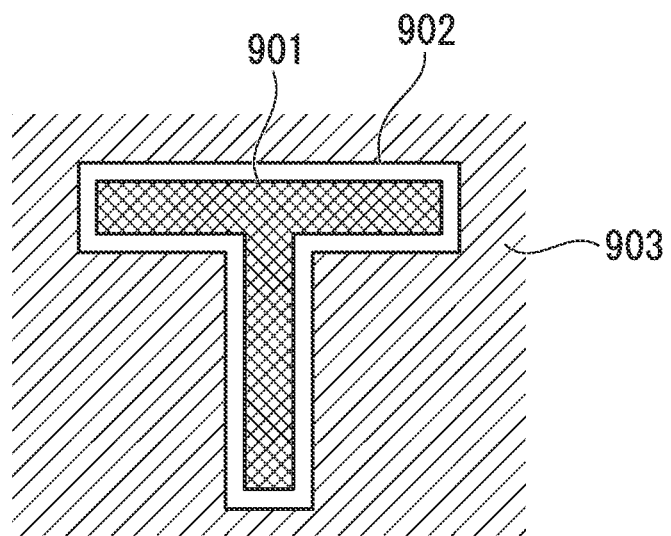
FIG. 9 is a simplified drawing showing an example of the text color and the background color of the image of information of the wireless settings in accordance with the first preferred embodiment of the present invention.

With regard to the background color of the image of information of the wireless settings, settings may be done by the setting information synthesis unit 231, based on the color of the image data in "the immediately previous display frame" in the same region as the region in which the image of information of the wireless settings of "the frame that includes the image of information of the wireless settings" is displayed. FIG. 9 is a simplified drawing showing an example of the text color and the background color of the image of information of the wireless settings in accordance with the first preferred embodiment of the present invention. In the example illustrated, the character 901 that represents the information of the wireless settings is itself black, the color of the region 902 of several pixels surrounding the character 901 is white, and the other region 903 (background color of the image of information of the wireless settings) is made a color in the same family as the background color corresponding the same region of the immediately previously displayed frame. For example, if the image data of "the frame displayed immediately previous" to "the frame including the image of information of the wireless settings" represents an image of a field of grass, and color of the region that is the same as the region in which the image of information of the wireless settings is displayed is green, the background color of the image of information of the wireless settings is made green. By doing this, the receiving device 20 can display the information of the wireless settings on the display unit 22 so as not to impart a feeling of visual unnaturalness to the user.

Second Preferred Embodiment

The second preferred embodiment of the present invention will be described below, with references made to the drawings. The point of difference with respect to the first preferred embodiment is the point of the image of information of the wireless settings being synthesized into (overlaid onto) an image frame and displayed. The constitution of the transmitting and receiving system 1 of the second preferred embodiment is the same as the constitution of the transmitting and receiving system 1 of the first preferred embodiment. The constitution of the transmitting device 10 in the second preferred embodiment is the same as the constitution of the transmitting device 10 in the first preferred embodiment. Also, the constitution of the receiving device 20 in the second preferred embodiment is the same as the constitution of the receiving device 20 in the first preferred embodiment.

Figure 10A:
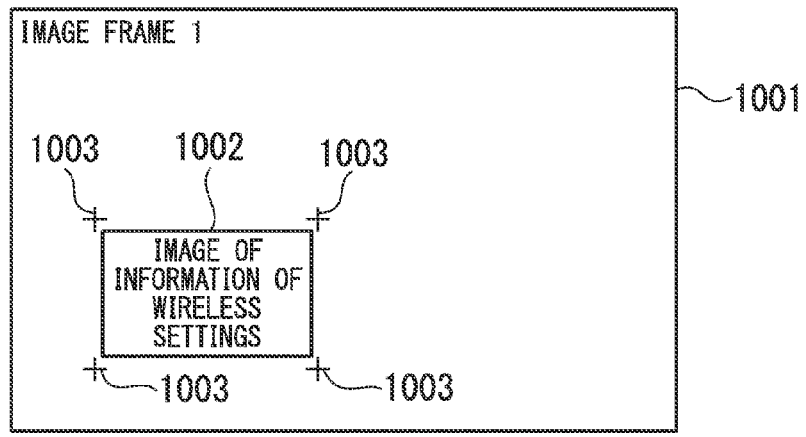
FIGS. 10A to 10C are simplified drawings showing an example of the synthesized image frame synthesized with the image of information of the wireless settings that is displayed by the receiving device in accordance with the second preferred embodiment of the present invention.
Figure 10B:
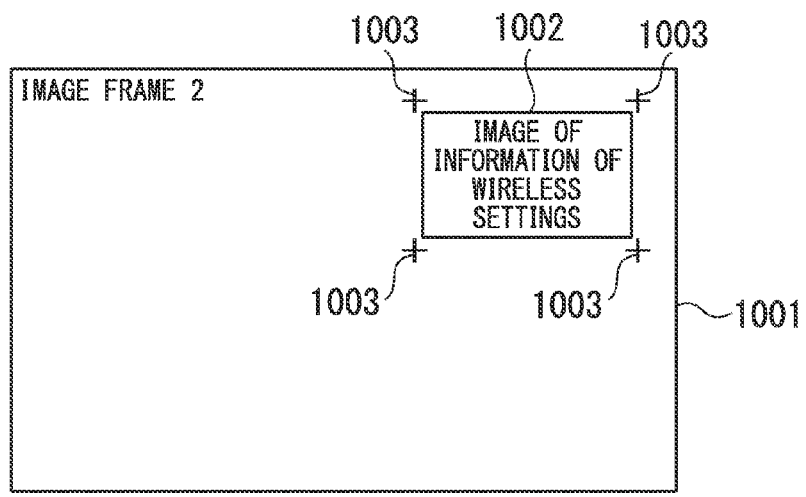
Figure 10C:
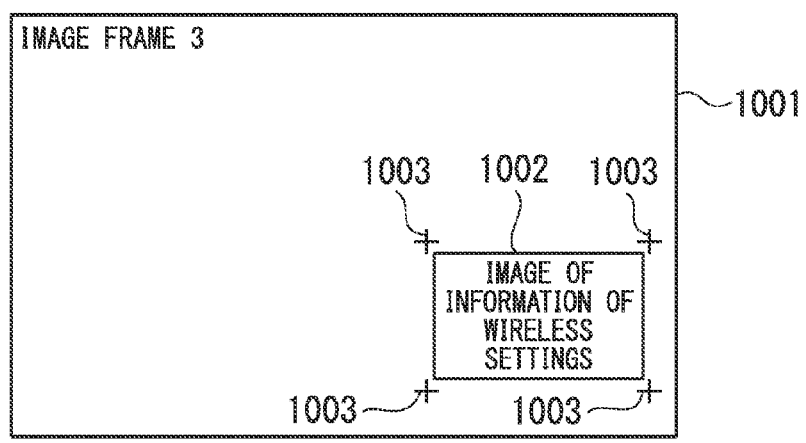

Next, the synthesized image frame synthesized with the image of information of the wireless settings and displayed by the receiving device 20 will be described. FIG. 10A to FIG. 10C are simplified drawings showing an example of the synthesized image frame synthesized with the image of information of the wireless settings that is displayed by the receiving device 20. In the example illustrated in FIG. 10A, an image of information of the wireless settings 1002 and the symbols "+" 1003 indicating the inclusion of the image of information of the wireless settings 1002 are displayed in the lower-left region of the synthesized image frame 1001. In the example illustrated in FIG. 10B, the image of information of the wireless settings 1002 and the symbols "+" 1003 indicating the inclusion of the image of information of the wireless settings are displayed in the upper-right region of the synthesized image frame 1001. In the example illustrated in FIG. 10C, the image of information of the wireless settings 1002 and the symbols "+" 1003 indicating the inclusion of the image of information of the wireless settings are displayed in the lower-right region of the synthesized image frame.

The receiving device 20 displays the synthesized image frame 1001 in the sequence of FIG. 10A to FIG. 10C, and by having the image of information of the wireless settings 1002 displayed in positions that differ from the positions in previous and subsequent frames, the display of the image of information of the wireless settings 1002 in the respective regions for two or more continuous frames is eliminated. Also, the frame rate when displaying a movie on the display unit 22 of the receiving device 20 is, for example, 60 fps. In this case, the display unit 22 displays a movie image by displaying a frame every 1/60 s (16 ms). By doing this, in the second preferred embodiment as well, because the image of information of the wireless settings 1002 is displayed in each of the regions for no more than approximately 16 ms, it is not possible for the human eye to notice the image of information of the wireless settings 1002. For this reason, if the image of information of the wireless settings 1002 is displayed in neighboring frames in different regions, the user will only see the movie image.

Also the size of the image of information of the wireless settings 1002 may be controlled in accordance with the characteristics of the image frame into which the image of information of the wireless settings 1002 is synthesized. For example, if the image of information of the wireless settings 1002 is synthesized into a low-luminance region within the image frame, because it is not as noticeable as the case in which the image of information of the wireless settings 1002 is synthesized into a high-luminance region, the size of the image of information of the wireless settings 1002 is adjusted for display to the size of the low-luminance region within the image frame.

Figure 11A:
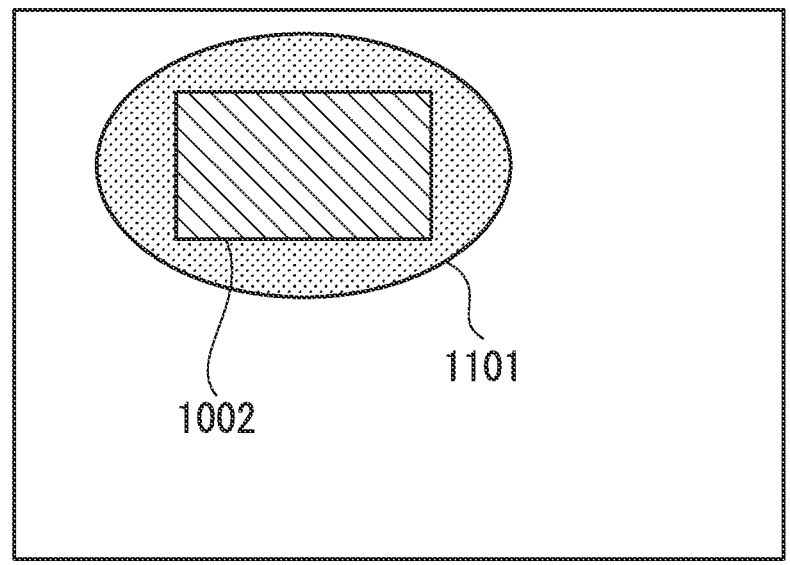
FIGS. 11A and 11B are simplified drawings showing an example of the display by the receiving device of the image of information of the wireless settings in accordance with the luminance (color arrangement) of the image frame in accordance with the second preferred embodiment of the present invention.
Figure 11B:
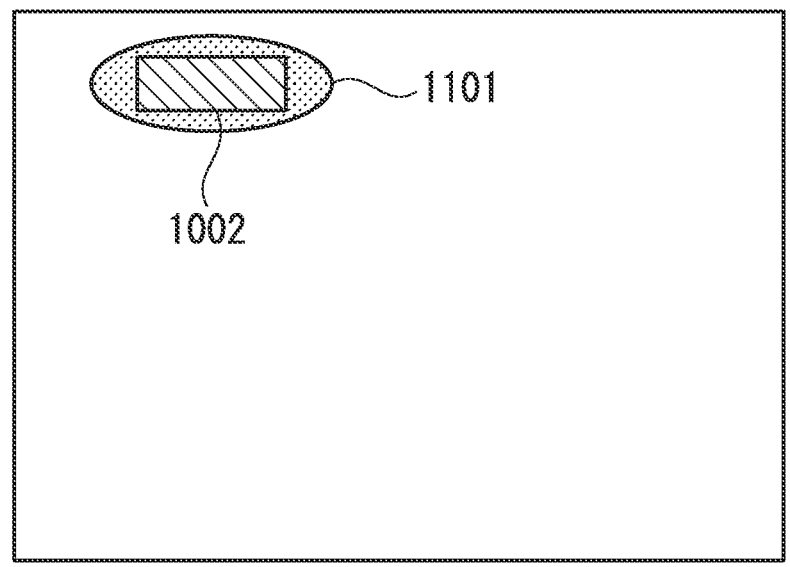

FIG. 11A and FIG. 11B are simplified drawings showing an example of the display by the receiving device 20 of the second preferred embodiment of the image of information of the wireless settings in accordance with the luminance (color arrangement) of the image frame. In the example illustrated in FIG. 11A, because the low-luminance region 1101 in the region in which the image of information of the wireless settings 1002 is synthesized is large, the image of information of the wireless settings 1002 is displayed large. In the example illustrated in FIG. 11B, because the low-luminance region 1101 in the region in which the image of information of the wireless settings 1002 is synthesized is small, the image of information of the wireless settings 1002 is displayed small. Although the judgment of high or low luminance is arbitrary, the highest value of luminance and the lowest value of luminance within the image frame may be extracted, and a judgment may be made that a luminance below a prescribed threshold value established within that range is low luminance. If there is no region or only a small region that has a luminance below the prescribed threshold value and it is not possible to synthesize the setting information, the setting information need not be synthesized into that image frame. By doing this, the receiving device 20 can display the information of the wireless settings on the display unit 22 so that the user does not feel any visual unnaturalness.

In the case of synthesizing the image of information of the wireless settings in a region of the image frame having a high frequency (high-frequency region), because it is not more noticeable than the case in which the image of information of the wireless settings is synthesized in region having a low frequency (low-frequency region), the size of the image of information of the wireless settings 1002 may be adjusted for display to the size of the high-frequency region within the image frame. The method of judging high and low frequency is the same as for high and low luminance.

Next, the protocol for displaying the information of the wireless settings on the display unit 22 when the image data transmitted from the transmitting device 10-1 is displayed on the display unit 22 will be described. The following is a description using the example in which the transmitting device 10 communicating with the receiving device 20 is switched from the transmitting device 10-1 to the transmitting device 10-2 when a wireless communication connection is established between the transmitting device 10-1 and the receiving device 20, image data is transmitted from the transmitting device 10-1 to the receiving device 20, and the receiving device 20 is displaying the received image data on the display unit 22.

Figure 12:
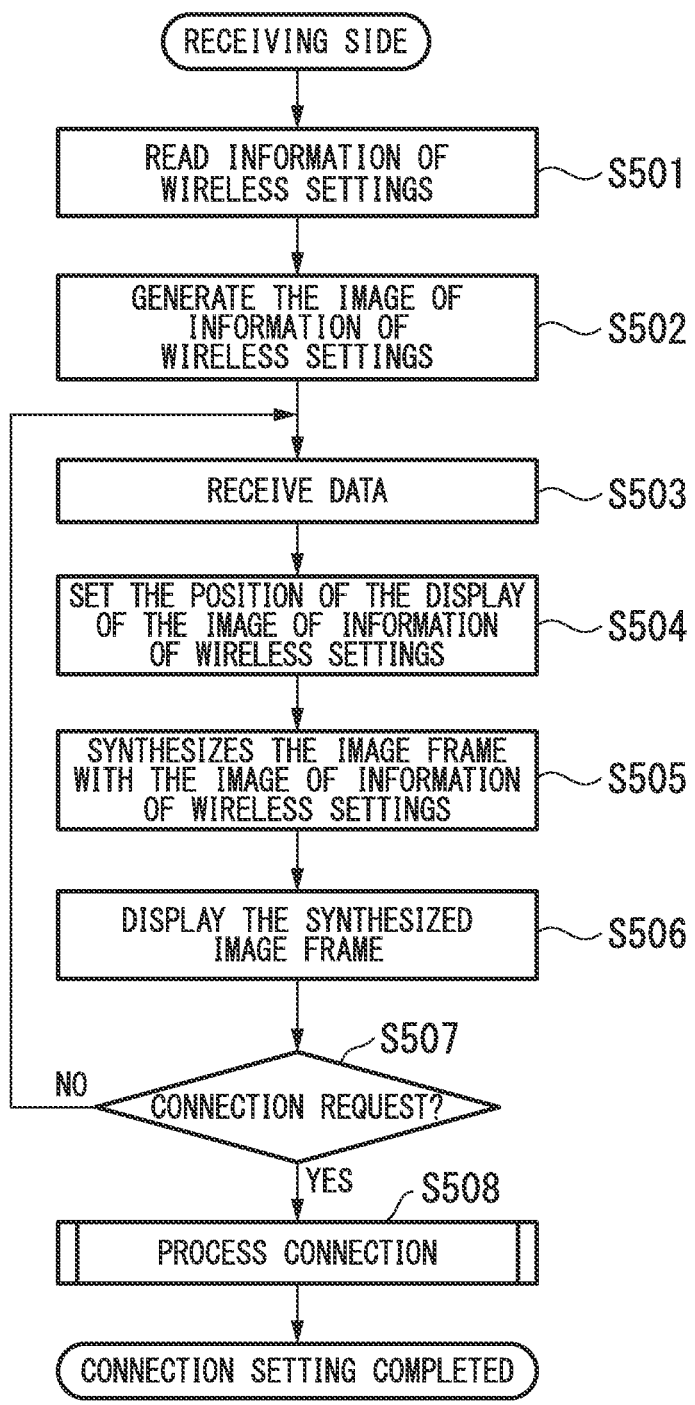
FIG. 12 is a flowchart showing the protocol for displaying the image of information of the wireless settings on the display unit in accordance with the second preferred embodiment of the present invention.

FIG. 12 is a flowchart showing the protocol for displaying the image of information of the wireless settings on the display unit 22 when the receiving device 20 of the second preferred embodiment is displaying the image data transmitted from the transmitting device 10-1 on the display unit 22.

(Step S501)
The control unit 25 of the receiving device 20 reads the information of the wireless settings stored in the storage unit 24. After that, processing proceeds to the step S502.
(Step S502)
The setting information synthesis unit 231 of the display control unit 23 converts the information of the wireless settings read by the control unit 25 at step S501 to an image of information of the wireless settings. After that, processing proceeds to the step S503.
(Step S503)
The wireless communication unit 21 receives data. After that, processing proceeds to the step S504.
(Step S504)
The display control unit 23 decides the position for synthesis of the image of information of the wireless settings within the image frame so that the image of information of the wireless settings is displayed at a position that is different from the position of the display of the image of information of the wireless settings in a previous frame. After that, processing proceeds to the step S505.
(Step S505)
The setting information synthesis unit 231 of the display control unit 23 synthesizes the image of information of the wireless settings generated at the step S502 at the position within the image frame determined at the step S504, and generates a synthesized image frame. After that, processing proceeds to the step S506.
(Step S506)
The display control unit 23 displays the synthesized image frame generated at the step S505 on the display unit 22. After that, processing proceeds to the step S507.
(Step S507)
The control unit 25 judges whether or not the data received by the wireless communication unit 21 at the step S503 is a connection request signal. If the control unit 25 judges that the data received by the wireless communication unit 21 is a connection request signal, processing proceeds to the step S508, and in other cases processing proceeds to the step S503.
(Step S508)
The control unit 25 performs connection processing. After that, processing is ended.

The protocol for connection processing in the receiving device 20 of the second preferred embodiment is the same as the connection processing in the receiving device 20 of the first preferred embodiment. In the second preferred embodiment, the operating protocol for connecting a new transmitting device 10 to the receiving device 20 is the same as the operating protocol for connecting a new transmitting device 10 to the receiving device 20 in the first preferred embodiment. The protocol for connection processing in the transmitting device 10 in the second preferred embodiment is the same as the protocol for connection processing in the transmitting device 10 of the first preferred embodiment.

As described above, according to the second preferred embodiment, in the receiving device 20, because the image of information of the wireless settings is synthesized and displayed at a position different from the previous and subsequent frames when the image frame is displayed, there is no display of the image of information of the wireless settings for two or more continuous frames in the respective regions. For this reason, if image of information of the wireless settings is displayed in different regions in previous and subsequent frames, the user sees only the movie image, enabling the receiving device 20 to display the information of the wireless settings without wasting a display region on the display unit 22. Because the transmitting device 10 can obtain the information of the wireless settings by merely capturing an image of the display unit 22 of the receiving device 20, it is possible to for the user to merely bring the image capturing unit 11 of the transmitting device 10 into opposition with the display unit 22 of the receiving device 20 and to cause the image capturing unit 11 to capture an image of the display unit 22 to enable settings of a wireless connection between the transmitting device 10 and the receiving device 20 both simply and reliably.

Although the second preferred embodiment as described generates an image frame into which the image of information of the wireless settings is synthesized within an image frame and the synthesized image frame is display on the display unit 22, this is not a restriction. For example, rather than displaying the synthesized image frame on the display unit 22, the image frame and the image of information of the wireless settings may be displayed simultaneously on the display unit 22 (picture-in-picture).

Third Preferred Embodiment

The third preferred embodiment of the present invention will be described below. The point of difference with respect to the second preferred embodiment is the point of the information of the wireless settings in the third preferred embodiment being divided, each of the divided information of the wireless settings being converted to an image, divided images of information of the wireless settings being generated, the divided image of information of the wireless settings being synthesized into an image frame, and the image being displayed.

The constitution of the transmitting and receiving system 1 of the third preferred embodiment is the same as the transmitting and receiving system 1 of the second preferred embodiment. The constitution of the transmitting device 10 in the third preferred embodiment is the same as the constitution of the transmitting device 10 in the second preferred embodiment. Also, the constitution of the receiving device 20 in the third preferred embodiment is the same as the constitution of the receiving device 20 in the second preferred embodiment.

Next, the divided synthesized image frame that synthesizes the divided images of information of the wireless settings and that is displayed by the receiving device 20 will be described. For example, in the case of a small display unit 22, it can be envisioned that the image of information of the wireless settings also becomes small and it is not possible for the transmitting device 10 to accurately extract the image of information of the wireless settings. For this reason, the setting information synthesis unit 231 of the transmitting device 10 divides the information of the wireless settings and converts each of the divided information of the wireless settings into images and generates divided images of information of the wireless settings. Then, the setting information synthesis unit 231 performs adjustment so that the generated divided images of information of the wireless settings are displayed at different position in each frame, and synthesizes the divided images of information of the wireless settings and the image frame, thereby generating a divided synthesized image frame.

Figure 13:
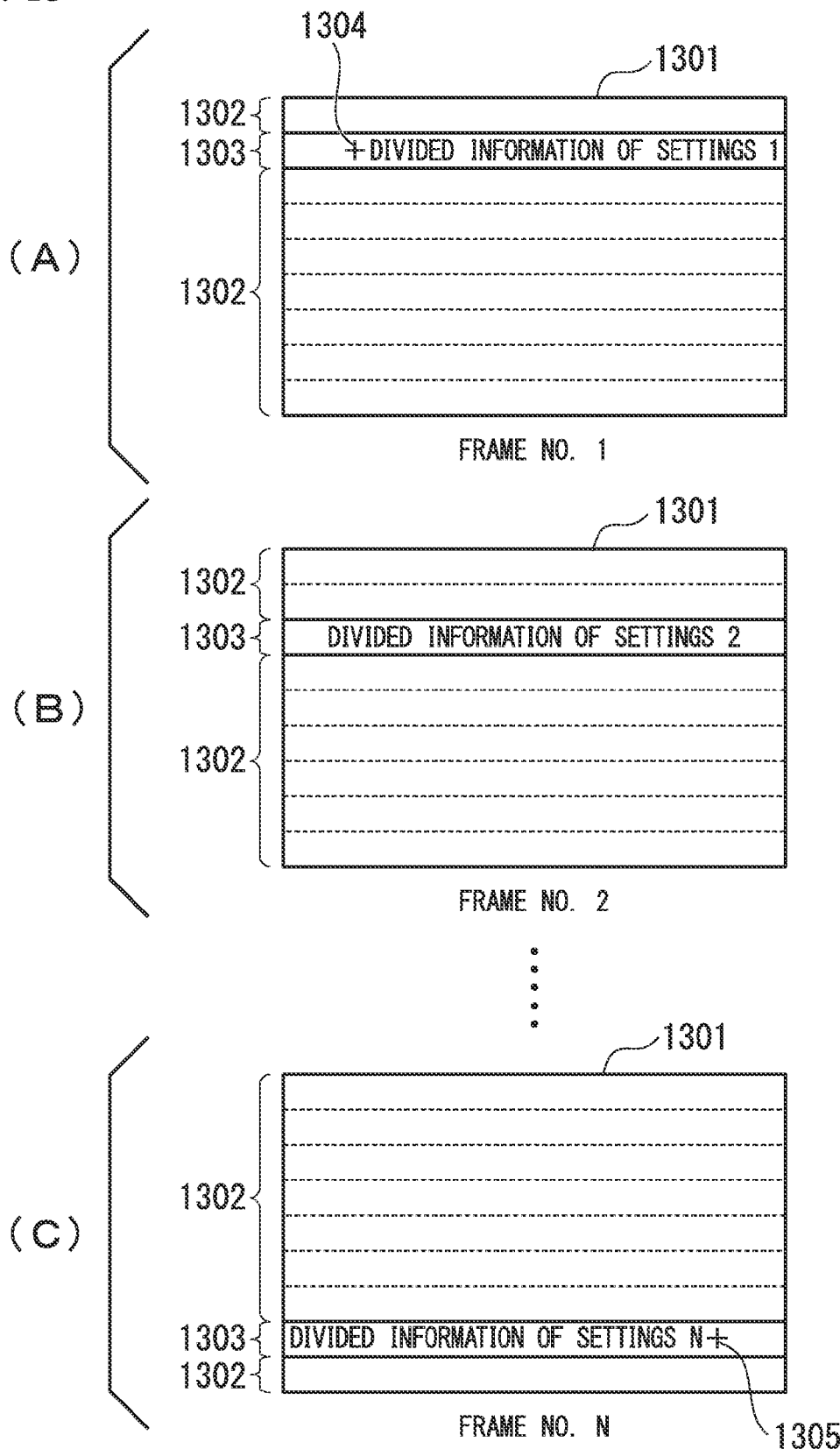
FIGS. 13(A) to 13(C) are simplified drawings showing an example of a divided synthesized image frame into which are synthesized the divided images of information of the wireless settings, and which is displayed by the receiving device in accordance with the third preferred embodiment of the present invention.

FIG. 13 is a simplified drawing showing an example of a divided synthesized image frame into which are synthesized the divided images of information of the wireless settings, and which is displayed by the receiving device 20. In the illustrated example, the image data is displayed by the progressive method.

In FIG. 13, (A) is a drawing showing the divided synthesized image frame of the first frame. In the illustrated example, the divided synthesized image frame 1301 is divided into a plurality of lines (divided into lines that can synthesize the information of settings in a single image frame), the divided image of information of the wireless settings 1303 being displayed on the second line from the top, with the other lines displaying the image data 1302. In FIG. 13, (B) is a drawing showing the divided synthesized image frame 1301 of the second frame. In the illustrated example, the divided synthesized image frame 1301 is divided into a plurality of lines, the second divided image of information of the wireless settings 1303 being displayed in the third line from the top, with the other lines displaying the image data 1302. In FIG. 13, (C) is a drawing showing the divided synthesized image frame 1301 of the N-th frame. In the illustrated example, the divided synthesized image frame 1301 is divided into a plurality of lines, the N-th divided image of information of the wireless settings 1303 being display in the second line from the bottom, with the other lines displaying the image data 1302.

In the case of using the interlaced method, because even and odd lines are displayed pixel by pixel, when the image of information of the wireless settings is synthesized, the characters are displayed with skipping. However, by image processing at the transmitting device side forms this into a single image frame, character recognition is possible.

The receiving device 20 displays the divided synthesized image frame 1301 on the display unit 22 in the sequence of (A), (B), and (C) in FIG. 13, so that the divided image of information of the wireless settings 1303 is displayed at different position in neighboring frames, so that the divided image of information of the wireless settings 1303 is not displayed for two or more frames in the respective regions. The frame rate of the receiving device 20 displaying a movie image on the display unit 22 is, for example, 60 fps, in which case the display unit 22 displays a frame every $\frac{1}{60}$ s (16 ms), thereby displaying a movie image. By doing this, in the third preferred embodiment as well, because the divided image of information of the wireless settings 1303 is displayed in each of the regions for no more than approximately 16 ms, it is not possible for the human eye to notice divided synthesized image of information of the wireless settings 1303. For this reason, if the divided image of information of the wireless settings 1303 is displayed in neighboring frames in different regions, the user will see only the movie image.

As the information included in the divided image of information of the wireless settings 1303, for example, the monitor name is included in the first divided image of information of the wireless settings 1303, the MAC address is included in the second divided image of information of the wireless settings 1303, the communication channel information is included in the third divided image of information of the wireless settings 1303, and the network ID is included in the fourth divided image of information of the wireless settings 1303. In the divided images of information of the wireless settings 1303 in which information of the wireless settings is divided and displayed, one example that may be used is to explicitly indicate the SOF (Start of Frame) and EOF (End of Frame) so as to explicitly indicate the starting position and the ending position of the divided image of information of the wireless settings. A method of explicitly indicating the SOF and the EOF uses, for example, characters or symbols that indicate the SOF and EOF. In FIG. 13, (A) shows the symbol "+" 1304 at the beginning of the first line after an even-numbered line as a symbol explicitly indicating the SOF. In FIG. 13, (C) shows the symbol "+" 1305 at the end of the first line above an even-numbered line as a symbol explicitly indicating the EOF. For a frame in which the SOF and EOF are not explicitly indicated, if the previous frame includes a divided image of information of the wireless settings 1303, because the next frame will also include a divided image of information of the wireless settings 1303, it is not necessary to display a symbol that explicitly indicates the inclusion of the divided image of information of the wireless settings 1303.

Figure 14:
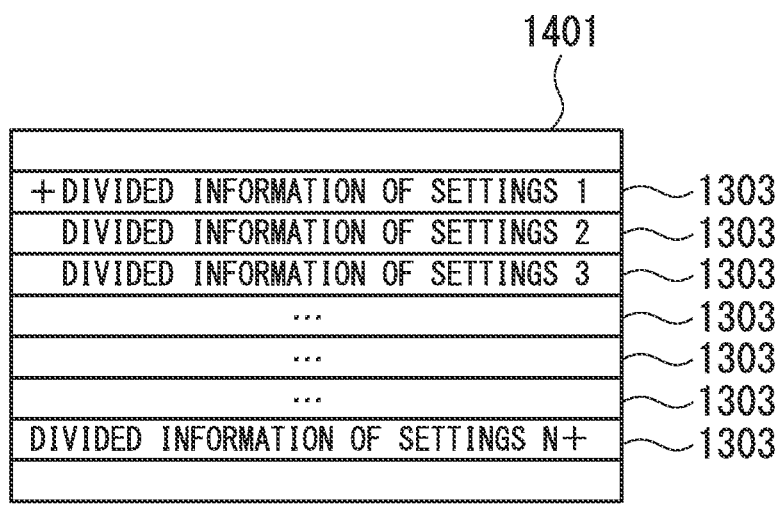
FIG. 14 is a simplified drawing showing an example of an image of information of the wireless settings reconstructed based on a plurality of divided synthesized image frames imaged by the transmitting device in accordance with the third preferred embodiment of the present invention.

Next, the image capturing of a plurality of divided images of information of the wireless settings and the reconstruction of the image of information of the wireless settings by the transmitting device 10 will be described. FIG. 14 is a simplified drawing showing an example of an image of information of the wireless settings reconstructed based on a plurality of divided synthesized image frames imaged by the transmitting device 10. The illustrated example is an example of the transmitting device 10 reconstructing the image of information of the wireless settings 1401 based on the divided synthesized image frames 1301 shown in FIG. 13. The illustrated image of information of the wireless settings 1401 is divided into a plurality of lines, with the first divided information of the wireless settings 1303 being displayed on the second line from the top. The second divided information of the wireless settings 1303 is displayed on the third line from the top, and the other lines are as illustrated.

Next, the protocol for displaying the information of the wireless settings on the display unit 22 when the receiving device 20 displays image data transmitted from the transmitting device 10-1 on the display unit 22. The following description uses an example in which a wireless communication connection is established between the transmitting device 10-1 and receiving device 20, with image data transmitted from the transmitting device 10-1 to the receiving device 20 and, when the receiving device 20 displays the received image data on the display unit 22, the transmitting device 10 that is communicating with the receiving device 20 is switched from the transmitting device 10-1 to the transmitting device 10-2.

Figure 15:
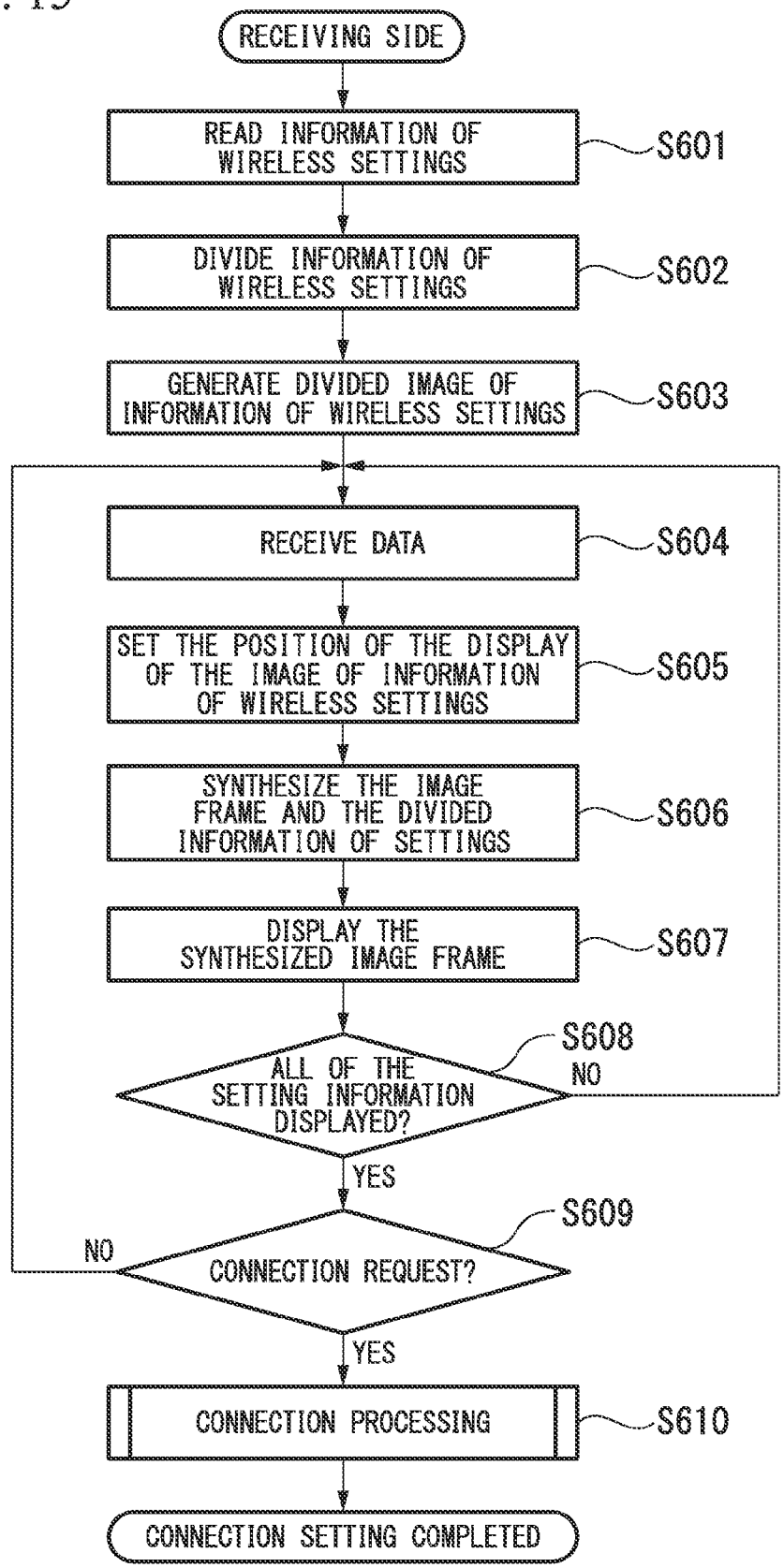
FIG. 15 is a flowchart showing the protocol for displaying the information of the wireless settings on the display unit in accordance with the third preferred embodiment of the present invention.

FIG. 15 is a flowchart showing the protocol for displaying the information of the wireless settings on the display unit 22 when the receiving device 20 of the third preferred embodiment displays image data transmitted from the transmitting device 10-1 on the display unit 22.

(Step S601)

The control unit 25 of the receiving device 20 reads the information of the wireless settings stored by the storage unit 24. After that, processing proceeds to the step S602.

(Step S602)

The setting information synthesis unit 231 of the display control unit 23 divides the information of the wireless settings read by the control unit 25 at the step S601 and generates divided information of the wireless settings. After that, processing proceeds to the step S603.

(Step S603)

The display control unit 23 converts the divided information of the wireless settings generated at the step S602 to a divided image of information of the wireless settings. After that, processing proceeds to the step S604.

(Step S604)

The wireless communication unit 21 receives data. After that, processing proceeds to the step S605.

(Step S605)

The display control unit 23 decides the position of the display of the divided image of information of the wireless settings within the image frame so that the prescribed divided image of information of the wireless settings is displayed at a position that is different from the position at which the divided image of information of the wireless settings has been displayed in the previous frame. After that, processing proceeds to the step S606.

(Step S606)

The setting information synthesis unit 231 of the display control unit 23 synthesizes the divided image of information of the wireless settings generated at the step S603 at a prescribed position within the image frame, which has been decided at the step S605, and generates a divided synthesized image frame. After that, processing proceeds to the step S607.

(Step S607)

The display control unit 23 displays on the display unit 22 the divided synthesized image frame generated at the step S606. After that, processing proceeds to the step S608.

(Step S608)

The display control unit 23 judges whether or not generated at the step S603 has been displayed on the display unit 22. If the display control unit 23 judges that all of the divided image of information of the wireless settings generated at the step S603 has been displayed on the display unit 22, processing proceeds to step S609, and in other cases, processing returns to the step S604.

(Step S609)

The control unit 25 judges whether or not the data received by the wireless communication unit 21 at the step S604 is a connection request signal. If the data received by the wireless communication unit 21 is judged by the control unit 25 to be a connection request signal, processing proceeds to step S610, and in other cases processing returns to the step S604.

(Step S610)

The control unit 25 performs connection processing. After that, processing is ended. The protocol for connection processing in the receiving device 20 in the third preferred embodiment is the same as the protocol for connection processing in the receiving device 20 of the second preferred embodiment.

Figure 16:
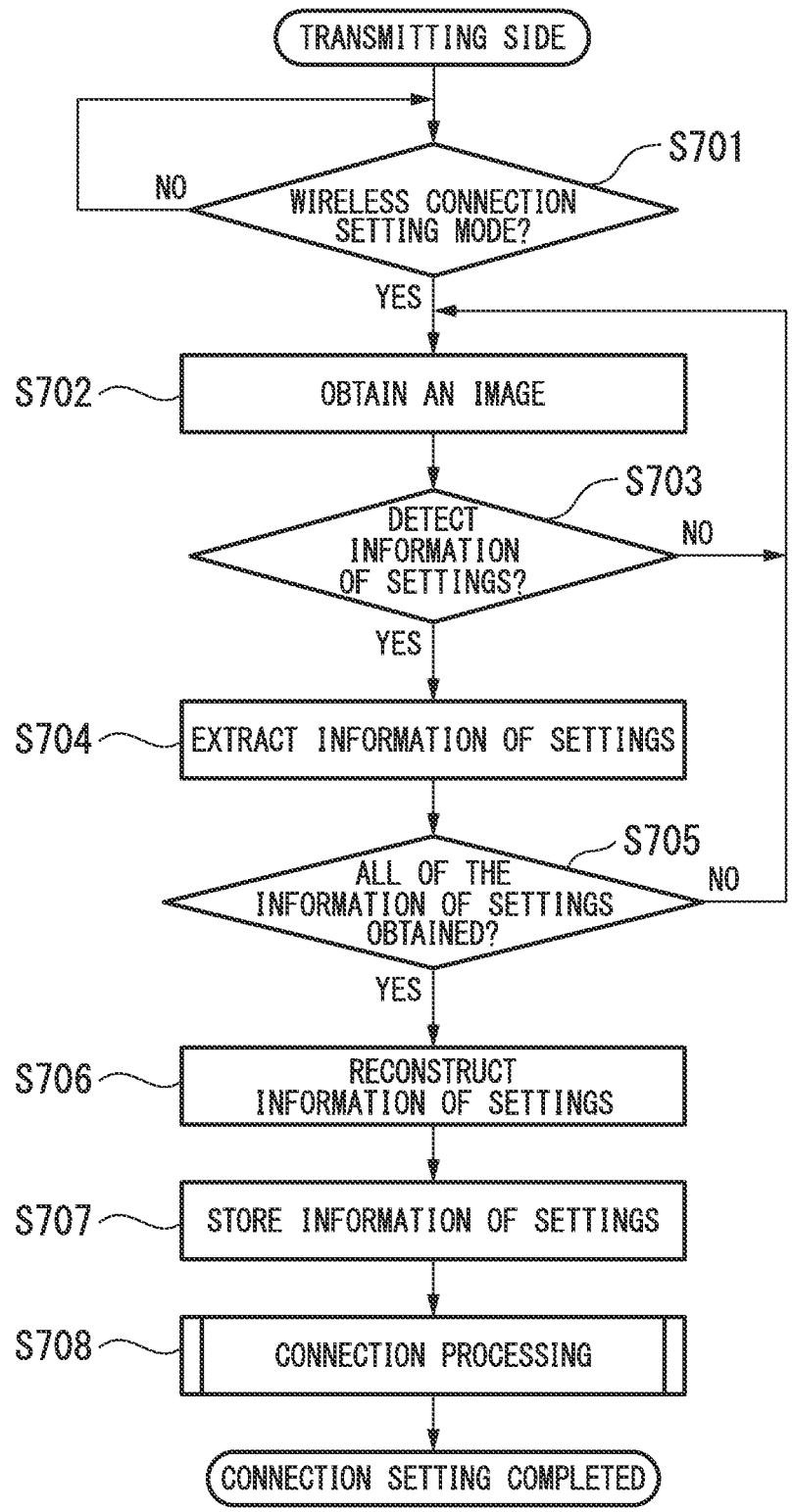
FIG. 16 is a flowchart showing the operating protocol for a transmitting device to be newly connected to the receiving device in accordance with the third preferred embodiment of the present invention.
Figure 17:
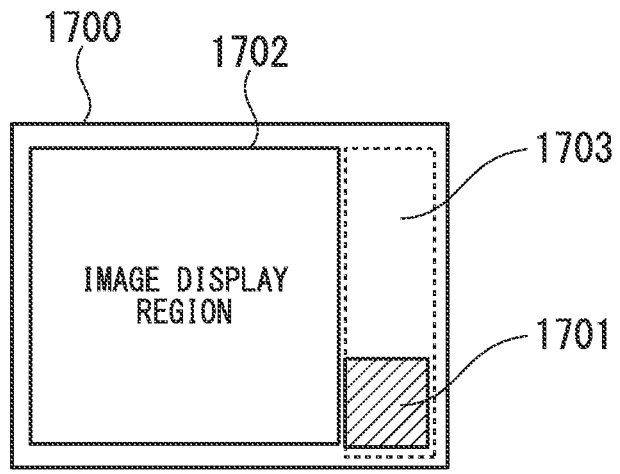
FIG. 17 is a simplified drawing showing an example of a display on a display unit when a display region of information of the wireless settings is provided as a region for displaying a two-dimensional code in accordance with the related art.
Figure 18:
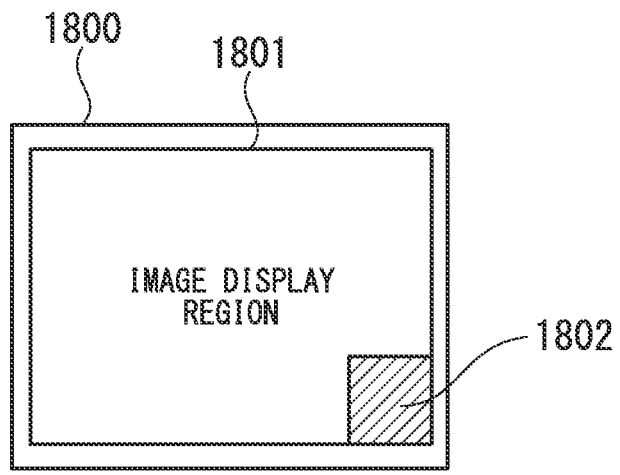
FIG. 18 is a simplified drawing showing an example of a display on a display unit when a two-dimensional code is displayed laid over an image or the like that is displayed in the image display region in accordance with the related art.

Next, the operating protocol for a transmitting device 10 to be newly connected to the receiving device 20 will be described. FIG. 16 is a flowchart showing the operating protocol for a transmitting device 10 to be newly connected to the receiving device 20. If a connection of a new transmitting device 10 is to be made to the receiving device 20, the user operates the operation unit 17 of that transmitting device 10, and switches the operating mode of the transmitting device 10 to the wireless connection setting mode.

(Step S701)

The control unit 14 of the transmitting device 10 judges whether or not the operating mode is the wireless connection setting mode. If the control unit 14 judges that the operating mode is the wireless connection setting mode, processing proceeds to the step S702, and in other cases the processing of the step S701 is executed again.

(Step S702)

The user brings the image capturing unit 11 of the transmitting device 10 into opposition with the display unit 22 of the receiving device 20 to which the connection is to be made. The image capturing unit 11 captures an image of the display unit 22 of the receiving device 20, and converts the optical image of the subject to a digital signal. The image processing unit 12 generates image data from the digital signal converted by the image capturing unit, and subjects the generated image data to image processing. After that, processing proceeds to the step S703.

(Step S703)

The setting information extraction unit 121 of the image processing unit 12 judges whether or not the image data generated at the step S702 includes a divided frame of information of the wireless settings. If the setting information extraction unit 121 judges that the image data generated at the step S702 includes a divided frame of information of the wireless settings, processing proceeds to the step S704, and in other cases processing returns to the step S702.

(Step S704)

The setting information extraction unit 121 extracts the divided information of the wireless settings from the image data generated at the step S702. After that, processing proceeds to the step S705. The specific method of extraction is, for example, if the divided information of the wireless settings is text data, character recognition processing is used to generate text data information of the divided information of the wireless settings.

(Step S705)

The setting information extraction unit 121 judges whether or not all of the divided information of the wireless settings has been obtained. If the setting information extraction unit 121 judges that all of the divided information of the wireless settings has been obtained, processing proceeds to the step S706, and in other cases processing returns to the step S702.

(Step S706)

The setting information extraction unit 121, based on the all of the obtained divided information of the wireless settings, reconstructs the information of the wireless settings. After that, processing proceeds to the step S707.

(Step S707)

The control unit 14 causes the storage unit 13 to store the information of the wireless settings reconstructed by the setting information extraction unit 121 at the step S706. After that, processing proceeds to the step S708.

(Step S708)

The control unit 14 performs connection processing. After that, processing is ended. The protocol for connection processing in the transmitting device 10 of the third preferred embodiment is the same as the protocol for connection processing in the transmitting device 10 of the second preferred embodiment.

As described above, according to the third preferred embodiment, the receiving device 20 divides the information of settings and converts the divided information of settings to a divided image of information of the wireless settings. When displaying image frames, because the receiving device 20 synthesizes and displays the divided image of information of the wireless settings at different positions in neighboring frames, divided images of information of the wireless settings are not displayed continuously for two or more frames in each of the respective regions. For this reason, if divided images of information of the wireless settings are displayed in different regions in neighboring frames, the user sees only the movie image, so that the receiving device 20 can display divided information of the wireless settings without wasting a display region on the display unit 22. Also, in the third preferred embodiment, because divided images of information of the wireless settings are displayed, even in the size of the display unit 22 is small, the receiving device 20 can display the divided images of information of the wireless settings with a size that can be read by the transmitting device 10.

Because the transmitting device 10 can reconstruct information of the wireless settings based on divided information of the wireless settings that it obtains the divided information of the wireless settings by merely image capturing the display unit 22 of the receiving device 20, by the user merely bringing the image capturing unit 11 of the transmitting device 10 into opposition with display unit 22 of the receiving device 20 and causing the image capturing unit 11 to capture the image of the display unit 22, it is possible to set wireless communication between a transmitting device 10 and the receiving device 20, both simply and reliably.

Furthermore, the third preferred embodiment always divides the information of settings, generates divided images of information of the wireless settings, and displays the generated divided images of information of the wireless settings, this is not a restriction. For example, the size of the display unit 22 may be compared with the size of the image of information of the wireless settings that is the information of settings in the form of an image and, if the size of the image of information of the wireless settings is at least ½ of the size of the display unit 22, as noted in the third preferred embodiment, the information of settings may be divided and divided image of information of the wireless settings generated and the generated divided images of information of the wireless settings displayed but, if the size of the image of information of the wireless settings is less than ½ of the size of the display unit 22, the image of information of the wireless settings may be displayed as in the first preferred embodiment or the second preferred embodiment.

Although the first to third preferred embodiments of the present invention have been described, with references made to the drawings, the specific constitution is not restricted to the preferred embodiments, and encompasses designs and the like within the spirit of the present invention.

The present invention can be applied to a receiving device and a transmitting device, and can switch the wireless connection simply, without reducing the display region on the display unit.

What is claimed is:

1. A receiving device, comprising:
   a receiving unit that receives image data from a first transmitting device with which the receiving device has established a wireless communication connection;
   a display unit that displays setting data necessary for a second transmitting device which is different from the first transmitting device to establish the wireless communication connection with the receiving device and the image data; and
   a display control unit that controls the display of the display unit, during a period before another wireless communication connection is established between the receiving device and the second transmitting device with which no wireless communication connection is established, so that the image data is displayed on the same display region as that of the display unit that displays the setting data in a frame displaying the setting data, in frames displayed before and after the frame including the setting data, and that, when a frame including the setting data is displayed on the display unit, controls the display of the display unit so that the same setting data or a part of the same setting data is displayed on a different display region from that in which the setting data is immediately previously displayed.

2. The receiving device according to claim 1, wherein, if the display unit displays a plurality of frames including the setting data, the display control unit controls the display of the display unit so as not to include the setting data in the prescribed frame.

3. The receiving device according to claim 1, wherein the display control unit controls the display of the display unit so that the setting data is displayed laid over a part of the display region of the display unit displaying image data.

4. The receiving device according to claim 1, wherein, if the display unit displays a frame including the setting data, the display control unit controls the display of the display unit so that only a part of the setting data is displayed and all or a part of the remaining setting data is displayed in a different frame from that frame.

5. A transmitting device, comprising:
an image capturing unit that captures an image on the display unit of the receiving device according to claim 1;
an identification unit that identifies, from the data imaged by the image capturing unit, the setting data necessary for establishing wireless communication connection with the receiving unit; and
a communication unit that establishes wireless communication connection with the receiving device based on the identified setting data, wherein the identification unit identifies the setting data based on a plurality of the data imaged a plurality of times by the image capturing unit.

6. The transmitting device according to claim 5, wherein the identification unit generates and identifies the setting data from a part of the setting data included in each of a plurality of the imaged data.

7. The receiving device according to claim 1, wherein, if the frame including the setting data is displayed on the display unit, the display control unit sets the background color within the display region of the setting data based on a color arrangement of the image data in the immediately previous displayed frame.

8. The receiving device according to claim 3, wherein, if the frame including the setting data is displayed on the display unit, the display control unit sets a position or size of the display region of the setting data based on a color arrangement of the image data laid over the setting data.

9. The receiving device according to claim 3, wherein, if the frame including the setting data is displayed on the display unit, the display control unit sets a position or size of the display region of the setting data based on frequency component information of the image data laid over the setting data.

10. The receiving device according to claim 1, wherein the display unit displays a symbol which indicates that the image data includes the setting data, and
the display control unit controls the display of the display unit, during the period before the other wireless communication connection is established between the receiving device and the second transmitting device with which no wireless communication connection is established, so that the image data is displayed on the same display region as that of the display unit that displays the setting data and the symbol in the frame displaying the setting data, in the frames displayed before and after the frame including the setting data, and that, when the frame including the setting data and the symbol is displayed on the display unit, controls the display of the display unit so that the same setting data or the part of the same setting data is displayed on a different display region from that in which the setting data is immediately previously displayed.

\* \* \* \* \*